US010183353B2

(12) United States Patent
Albrecht et al.

(10) Patent No.: US 10,183,353 B2
(45) Date of Patent: Jan. 22, 2019

(54) METHOD AND APPARATUS FOR WELDING WITH REDUCED SPATTER

(75) Inventors: Bruce P. Albrecht, Neenah, WI (US); Nathan G. Leiteritz, Little Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2041 days.

(21) Appl. No.: 13/234,838

(22) Filed: Sep. 16, 2011

(65) Prior Publication Data
US 2012/0067859 A1 Mar. 22, 2012

Related U.S. Application Data

(60) Provisional application No. 61/383,913, filed on Sep. 17, 2010.

(51) Int. Cl.
B23K 9/12 (2006.01)

(52) U.S. Cl.
CPC ..................... B23K 9/125 (2013.01)

(58) Field of Classification Search
USPC ................ 219/130.71, 130.01, 137 R, 119
See application file for complete search history.

(56) References Cited

U.S. PATENT DOCUMENTS

| | | |
|---|---|---|
| 4,717,807 A | 1/1988 | Parks et al. |
| 4,835,360 A | 5/1989 | Parks et al. |
| 4,866,247 A | 9/1989 | Parks et al. |
| 4,897,523 A | 1/1990 | Parks et al. |
| 4,954,691 A | 9/1990 | Parks et al. |
| 4,972,064 A | 11/1990 | Stava |
| 5,001,326 A | 3/1991 | Stava |
| 5,003,154 A | 3/1991 | Parks et al. |
| 5,148,001 A | 9/1992 | Stava |
| 5,540,371 A * | 7/1996 | Gilliland ........................ 226/4 |
| 5,742,029 A | 4/1998 | Stava et al. |
| 5,916,464 A * | 6/1999 | Geiger ................ 219/137.71 |
| 5,961,863 A | 10/1999 | Stava |
| 6,051,810 A | 4/2000 | Stava |
| 6,160,241 A | 12/2000 | Stava et al. |
| 6,831,251 B1 * | 12/2004 | Artelsmair et al. ..... 219/137.71 |
| 6,963,048 B2 * | 11/2005 | Huismann et al. ...... 219/137.71 |
| 6,969,823 B2 | 11/2005 | Huismann et al. |
| 7,102,099 B2 | 9/2006 | Huismann et al. |
| 7,138,602 B2 | 11/2006 | Huismann et al. |
| 7,165,707 B2 | 1/2007 | Huismann et al. |
| 7,351,933 B2 | 4/2008 | Huismann et al. |
| 7,364,059 B2 | 4/2008 | Huismann et al. |
| 7,612,477 B2 * | 11/2009 | Abe et al. ........................ 310/90 |
| 7,999,209 B2 * | 8/2011 | Diekmann et al. ...... 219/137.31 |
| 2004/0245230 A1 * | 12/2004 | Huismann et al. ........ 219/137.7 |
| 2005/0040202 A1 * | 2/2005 | Kerekes et al. .............. 226/186 |

(Continued)

*Primary Examiner* — Anne M Antonucci
*Assistant Examiner* — Renee LaRose
(74) *Attorney, Agent, or Firm* — George R. Corrigan

(57) ABSTRACT

A method and apparatus for reducing spatter is disclosed. A welding gun, which can be an integrated part of a welding system, includes a device, such as a solenoid or motor and roller, to slow, stop or reverse the wire. The device is activated in response to feedback indicative of a short, a short that is about to form, or the imminent clearing of a short. The detection of the short, forming of a short, or clearing of a short is in response to feedback based on current and/or voltage. Output current can also be reduced.

5 Claims, 1 Drawing Sheet

(56) References Cited

U.S. PATENT DOCUMENTS

| | | | |
|---|---|---|---|
| 2006/0226137 A1* | 10/2006 | Huismann et al. | 219/137.71 |
| 2006/0237411 A1* | 10/2006 | Mendez et al. | 219/137 R |
| 2007/0145028 A1 | 6/2007 | Artelsmair | |
| 2009/0242534 A1 | 10/2009 | Artelsmair et al. | |
| 2012/0074115 A1 | 3/2012 | Kazmaier et al. | |

\* cited by examiner

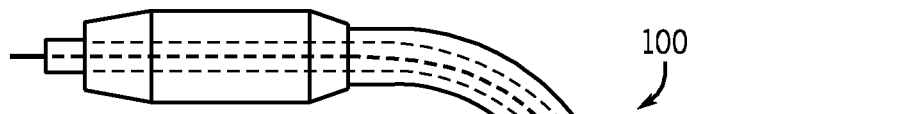
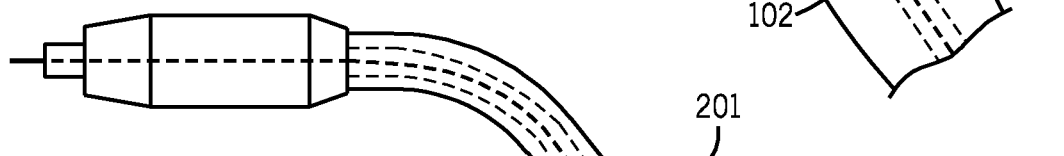
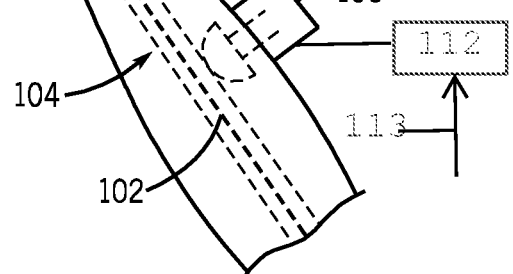
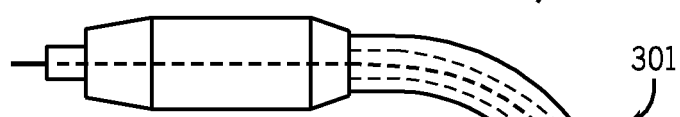
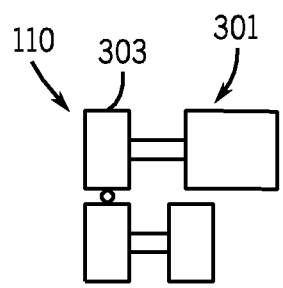
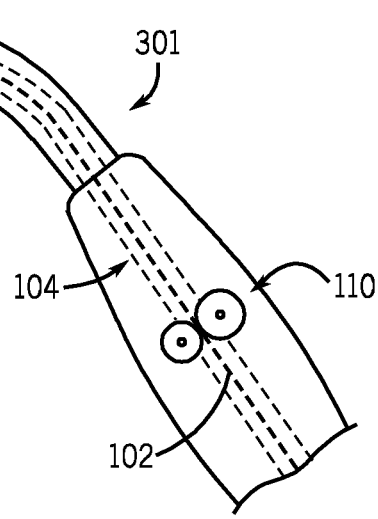

METHOD AND APPARATUS FOR WELDING WITH REDUCED SPATTER

FIELD OF THE INVENTION

The present invention relates generally to the art of welding power supplies. More specifically, it relates to arc starts and short clearing.

BACKGROUND OF THE INVENTION

There are many different arc welding processes used for numerous welding applications. While different processes have characteristics that render them desirable for particular applications, different processes share some characteristics, such a tendency to cause spatter when the arc is formed, such as at the beginning of a weld (particularly for a touch start) or when transitioning from a short circuit to an arc during the weld.

Spatter is caused during starts because the wire bridges to the work piece, forming a short, and resistive heating melts or softens wire and creates an arc in the middle of the wire bridge. The process causes spatter of the wire from the location where the arc formed to the wire on the workpiece. The wire continues to feed, and the process is repeated until a stable arc forms.

Prior art attempts at reducing spatter from starts include the Jetline® retract start. This provides for retracting the wire. The wire retraction causes an arc to form between the end of the wire and the workpiece, and reduces the likelihood of resistive heating with an arc forming midway between the gun and the workpiece. Other welding power supplies also provide a retract start.

Spatter is caused during the welding process when transitioning from the short circuit state to the arc state primarily by the high current needed to "pinch" off a droplet. The pinching off at high current can result in a violent disintegration of the molten metal bridge producing excessive weld spatter. Instability also results from the weld pool being pushed away.

Many attempts in the prior art were made to create a stable short circuit welding power supply, such as those shown in U.S. Pat. Nos. 4,717,807, 4,835,360, 4,866,247, 4,897,523, 4,954,691, 4,972,064, 5,001,326, 5,003,154, 5,148,001, 5,742,029, 5,961,863, 6,051,810 and 6,160,241. These patents generally disclose complicated control schemes that fail to control the process to provide a stable and effective weld. They include control schemes that try to control the deposition of material and/or predict or cause a transition to the subsequent state based on the total energy put into the weld, the length of the stick out, total watts, time of the preceding state, etc.

CSC (controlled short circuit) welding provides for retracting or slowing the wire during the transition from short to arc, and is described in U.S. Pat. Nos. 7,364,059, 7,351,933, 7,165,707, 7,138,602, 7,102,099, 6,969,823 and 6,963,048 (each of which is hereby incorporated by reference). Spatter is reduced by controlling the transition with the retraction (or slowing) of the wire, and by controlling the energy put into the weld with the current-voltage waveform. While these systems reduce spatter, they are particularly suited for processes with short circuits.

There is a need for a spatter control for low cost manual welding applications, and/or open arc welding processes.

SUMMARY OF THE PRESENT INVENTION

According to a first aspect of the invention a welding gun for reducing spatter includes a path for wire through the gun. A liner is disposed about the wire path for at least a portion of the path through the gun. A solenoid has an activated position that impinges on the wire path, and a deactivated position that does not impinge on the wire path. A control circuit includes a feedback input and control output connected to the solenoid.

According to a second aspect of the invention a welding gun for reducing spatter includes a path for wire through the gun. A liner is disposed about the wire path for at least a portion of the path through the gun. A motor, electromagnetic brake, or particle brake, connected to a roller, that, when activated, resists, slows, stops or reverses the wire feeding. A control circuit includes a feedback input and a control output connected to the motor.

According to a fourth aspect of the invention a method of reducing spatter in a welding process includes feeding a for wire through a welding gun to a workpiece. A welding output parameter that is indicative of an impending short is sensed. A solenoid or motor or brake is activated in response to the sensing, and that restrains the feeding of the wire. The solenoid or motor or brake is then deactivated, to cease the restraining of the feeding of the wire.

The liner includes a widened region that acts as a buffer for wire, in one alternative.

The control circuit includes a threshold circuit in another alternative.

The feedback input is connected to at least one of a voltage feedback signal and a current feedback signal in one embodiment.

The control circuit includes a derivative circuit connected between the feedback input and the threshold circuit and/or the control circuit includes a time delay circuit in various embodiments.

Other principal features and advantages of the invention will become apparent to those skilled in the art upon review of the following drawings, the detailed description and the appended claims.

BRIEF DESCRIPTION OF THE DRAWINGS

FIG. 1 is diagram of a welding gun in accordance with one embodiment of the invention;

FIG. 2 is diagram of a welding gun in accordance with another embodiment of the invention;

FIG. 3 is diagram of a welding gun in accordance with another embodiment of the invention; and FIG. 4 is diagram of a wire feed motor assembly of FIG. 3.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular welding guns, it should be understood at the outset that the invention can be implemented with other guns and other mechanisms to slow or retract the wire.

The invention provides for reducing spatter that occurs during starts, or when clearing a short after the process has been established. During a start, the wire typically advances toward the workpiece. The invention provides for reversing the wire, or stopping or slowing the advance of the wire, for a given duration. The slowing, reversing or stopping is performed in response to the output current or voltage crossing a threshold. Various embodiments provide for using functions of current and/or voltage, such as power, dP/dt, dI/dt, dV/dt, or higher order derivatives. Also, the current can be reduced to further reduce spatter. The frequency of short circuits can be 100-200 Hz, in an ongoing process.

The invention provides for reducing spatter during the welding process by reversing the wire, or stopping or slowing the advance of the wire, for a given duration when a short occurs, is about to clear, or is about to be formed. Also, the current can be reduced to further reduce spatter. When repeated shorts are an expected and desired part of the process (such as during short circuit welding) the wire is reversed, slowed or stopped when the short is about to clear. If the short is undesired, such as during pulse welding, then the wire is reversed, slowed or stopped when the short is formed, or when it is about to be formed. Feedback of a welding output parameter is preferably used to determine when to reverse, slow or stop the wire. Feedback of output current and/or voltage is more preferably used to determine when to reverse, slow or stop the wire. For example, when voltage or current crosses a threshold the wire can be reversed, slowed or stopped. Various embodiments provide for using functions of current and/or voltage, such as power, dP/dt, dI/dt, dV/dt, or higher order derivatives.

During a short voltage falls, and current usually rises. By reversing the wire, the voltage drop can be lessened, and the current increase can be lessened. Alternatively, the voltage and/or current can be controlled to have a smaller increase (current) or decrease (voltage) when the controller senses that a short is about to form or clear, and/or when the controller causes the wire to slow, stop or reverse.

Referring now to FIG. 1, a welding gun 100 has a welding wire 102 extending therethrough, and includes a liner 104 and a solenoid 106. Liner 104 includes a widened area 108, that acts as a buffer to store wire during the retraction (or slowing or stopping). The wire is retracted when solenoid 106 is activated to push downward (toward wire 102), and solenoid 106 impinges or encroaches on the wire path and pushes wire 102 into the widened area 108 of liner 104. This pulls the wire from the tip end of gun 100, thus retracting the wire. The control for the gun can be located with solenoid 106, shown as controller 112 in FIG. 2, particularly when it is a simple voltage or current based control, such as on feedback line 113. Power for the solenoid can be from the welding power source, scavenged from the weld or gun cable, or from a battery. Energy can be stored in a capacitor while the solenoid is not active, and the capacitor can discharge to activate the solenoid. Alternatives provide for the control of solenoid 106 to be located remotely, such as being part of the controller of the welding power supply and/or wire feeder. Other alternatives call for a linear actuator to be used in stead of the solenoid.

Referring now to FIG. 2, a welding gun 201 has welding wire 102 extending therethrough, and includes liner 104 and solenoid 106. However, liner 104 does not include widened area 108. When solenoid 106 is activated and pushes downward (toward wire 102), it pinches wire 102 against liner 104, thus slowing or stopping wire 102. Solenoid 106 can be designed to always stop the wire, always slow the wire, or allow the user to select either slowing or stopping. The amount of force exerted by solenoid 106, or the distance solenoid 106 travels, can be used to select between slowing or stopping the wire. The upstream length of liner 102 (toward the right of solenoid 106) acts as a buffer for wire 102 when solenoid 106 is activated. One embodiment provides for solenoid 106 to be retracted slowly so that wire 102 does not spring forward when solenoid 106 is completely retracted. The control for the gun can be located with solenoid 106, particularly when it is a simple voltage or current based control. Power for the solenoid can be from the welding power source, scavenged from the weld or gun cable, or from a battery. Energy can be stored in a capacitor while the solenoid is not active, and the capacitor can discharge to activate the solenoid. Alternatives provide for the control of solenoid 106 to be located remotely, such as being part of the controller of the welding power supply and/or wire feeder.

Referring now to FIG. 3, a welding gun 301 has welding wire 102 extending therethrough, and includes liner 104 and a wire feed motor assembly 110. When motor assembly 110 is engaged, it reverses, slows or stops wire 102. Motor assembly 110 can be designed to always stop the wire, always reverse the wire, always slow the wire, or allow the user to select an operating mode. The upstream length of liner 102 (toward the right of motor assembly 110) acts as a buffer for wire 102 when solenoid 106 is activated. Motor assembly 110 can include an electromagnetic or particle brake connected to the rollers to impede (slow, stop or reverse) the feeding of the wire. Motor assembly 110 includes a permanent magnet motor in one embodiment, and power for motor assembly 110 can be from the welding power source, scavenged from the weld or gun cable, or from a battery. Energy can be stored in a capacitor while the motor is not active, and the capacitor can discharge to activate the motor. The motor can also generate power and charge the capacitor. One embodiment provides for motor assembly 110 to be deactivated slowly so that wire 102 does not spring forward when motor assembly 110 is completely deactivated. The control for the gun can be located with motor assembly 110, particularly when it is a simple voltage or current based control. One embodiment provides for a permanent magnet motor, and/or for charging the capacitor or battery while idling forward during welding and using the energy stored in the capacitor or battery to reverse direction of the motor upon a short forming it sensing a short is about to be formed or about to clear. Alternatives provide for the control of motor assembly 110 to be located remotely, such as being part of the controller of the welding power supply and/or wire feeder. Other alternatives call for a linear actuator to be used in stead of the motor or brake.

FIG. 4 is a diagram of motor assembly 110 and shows a driven roller 303, a motor 301, and an idler roll 305. Motor 301 drives roller 303. Wire 201 is between and engaged by rollers 303 and 305. Roller 303 can be driven at a speed synched to the main wire feed motor when not activated, or it can be retracted or allowed to idle freely. Thus, when not engaged motor assembly 110 does not affect the wire feed speed.

Control/activation of the motor, solenoid, or other mechanism to slow or stop or reverse the wire can be based on a sensed a welding output parameter, or a signal indicative thereof. The sensed parameter can also be used to reduce current, or the current can be reduced in response to the activation, or the current can be reduced in response to sensing some other welding output parameter, or some other function of the sensed parameter.

The invention can be implemented on any welding system that uses a gun and a wire feeder, and can be used with any process. The invention can be sold as a gun for use with any system, where the controls are in the gun, or as part of an entire welding system, with control located at the gun, wire feeder, or power supply.

Numerous modifications may be made to the present invention which still fall within the intended scope hereof. Thus, it should be apparent that there has been provided in accordance with the present invention a method and apparatus for reducing spatter fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A welding gun for reducing spatter including, a path for wire through the gun, a liner, disposed about the wire path for at least a portion of the path through the gun, a solenoid, having an activated position that impinges on the wire path, and a deactivated position that does not impinge on the wire path, and a control circuit, including a feedback input and further including a control output connected to the solenoid, and wherein the liner includes a widened region where the solenoid is located that acts as a buffer for the wire, wherein the solenoid pushes the wire into the buffer.

2. The gun of claim 1, wherein the control circuit includes a threshold circuit.

3. The gun of claim 2, wherein the feedback input is connected to at least one of a voltage feedback signal and a current feedback signal.

4. The gun of claim 3, wherein the control circuit includes a derivative circuit connected between the feedback input and the threshold circuit.

5. The gun of claim 3, wherein the control circuit includes a time delay circuit.

* * * * *